Figure 1:
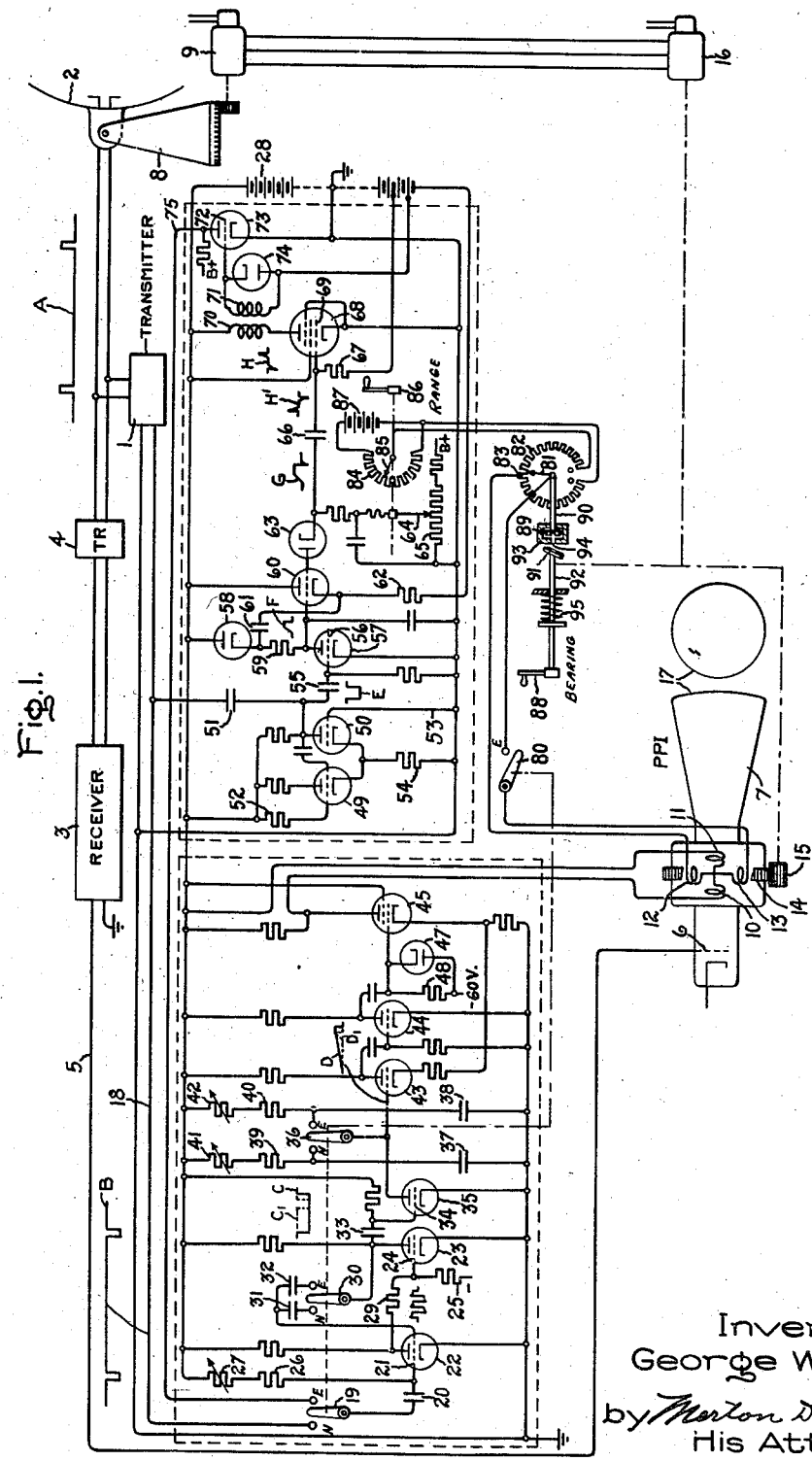

May 27, 1958 G. W. FYLER 2,836,812
EXPANDED DISPLAY FOR CATHODE RAY TUBES
Filed Nov. 2, 1945 2 Sheets-Sheet 1

Inventor:
George W. Fyler,
by Merton D Morse
His Attorney.

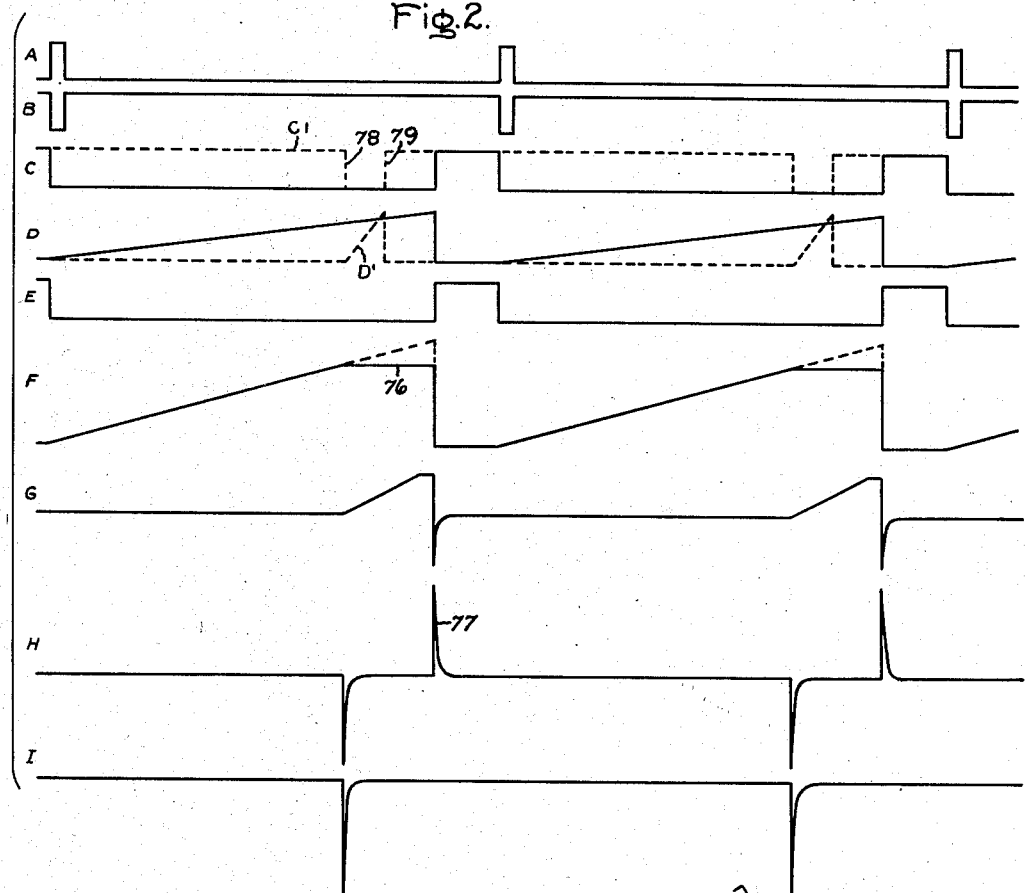
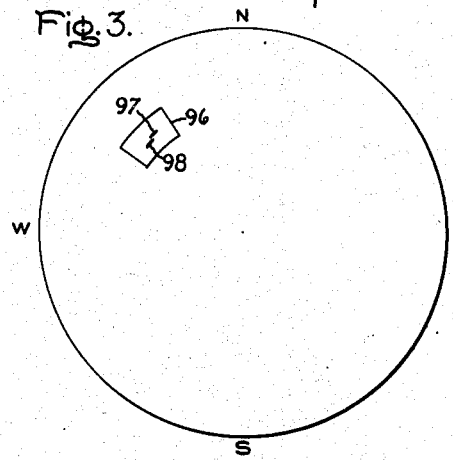
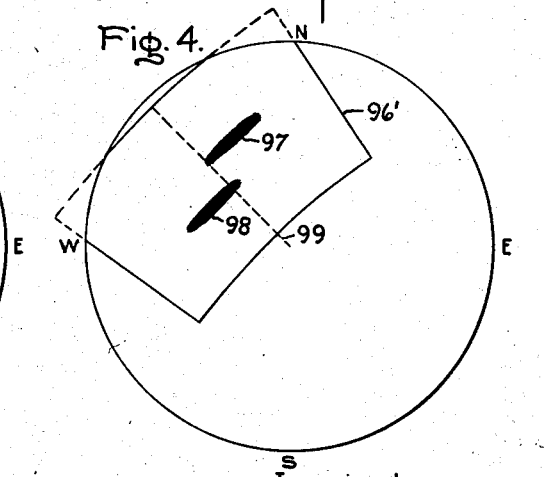

United States Patent Office 2,836,812
Patented May 27, 1958

2,836,812

EXPANDED DISPLAY FOR CATHODE RAY TUBES

George W. Fyler, Stratford, Conn., assignor to General Electric Company, a corporation of New York Application November 2, 1945, Serial No. 626,372

8 Claims. (Cl. 343—11)

My invention relates to radio detection and ranging systems in which recurrent pulses are radiated and echoes thereof from remote objects are received at times dependent upon the distance of such remote objects. It is a primary object of my invention to provide a new and improved means for displaying the position of detected objects in such a system.

In a radio detection and ranging system, it is frequently desirable to know the relative positions of reflecting objects, especially when these objects are at a distance. Thus, it has been noted that, in the control of airplanes, when the plan position indicator has a sweep of, for example, 50 miles radius, it is not possible to distinguish between two planes which are relatively closely spaced and which are at a substantial distance from the system. Knowledge of the relative positions of such planes is of greater interest for controlling the course of the respective planes. The effectiveness of the system becomes greater, therefore, if means are provided to enlarge a small area of the plan position indicator pattern so that the planes under consideration appear spaced apart and in their proper relative positions. Accordingly, it is another object of my invention to provide a new and improved method and means for enlarging the display of closely spaced distant objects in a radio detection and ranging system.

It is a further object of my invention to provide, in such a system using a cathode ray tube for scanning purposes, means for enlarging on the cathode ray tube a selected small portion of the area being scanned.

It is a still further object of my invention to provide a new and improved object detection and ranging system in which the display of relatively closely spaced distant objects is enlarged on a cathode ray tube, while at the same time the relative position of the enlarged scanned area is preserved so that the bearing and range of reflecting objects may be accurately determined.

It is still another object of my invention to provide a new and improved object detection and ranging system in which a selected area of a cathode ray tube may be enlarged, the selected area being variable in range and bearing and in which simultaneously the sweep circuit of the cathode ray tube is automatically controlled so that the total enlarged area is fixed in size and independent of range and bearing positions.

One of the features of my invention is the provision, in a radio detection and ranging system, of a plan position indicator and means selectively to delay the sweep circuit of that indicator so that objects appearing at a chosen distance from the system appear in enlarged size on the indicator. At the same time, control means are provided to space the reflecting objects apart laterally on the indicator, while maintaining them in proper relative bearing positions with respect to an accurately maintained midposition bearing.

Other objects of my invention will appear from the following description of my invention and the novel features which I believe to be characteristic of my invention are set forth with particularity in the appended claims. My invention itself, however, both as to its organization and method of operation, together with further objects and advantages thereof, may best be understood by the following description taken in connection with the accompanying drawing in which Fig. 1 is a diagrammatic representation of a portion of the circuits of the equipment employed in an embodiment of my invention; Fig. 2 is a group of curves showing certain operational characteristics of the circuits of Fig. 1; Fig. 3 illustrates the normal indication appearing on a cathode ray tube employed in the apparatus of Fig. 1; and Fig. 4 illustrates a typical enlarged display provided by the apparatus of Fig. 1.

In the following specification, the term "echo pulses," when used, may apply, of course, to pulses produced by reflection of radiated pulses from remote reflecting surfaces or which may be produced by equipment carried by remote bodies, such as an airplane operating in response to a transmitted pulse. In this specification, I shall refer to any pulses received as a result of a transmitted pulse as "echo pulses."

Referring to Fig. 1, I have indicated in the upper portion thereof a transmitter 1 which is recurrently pulsed by means of a suitable keyer, not shown, to supply high frequency pulses to a directive antenna system 2 so that the high frequency pulses may be radiated into space. The echoes of the radiated pulses received by the antenna 2 are supplied to a receiver 3 through the usual TR box 4. The equipment 4 operates to protect the equipment of the receiver from the high intensity of the pulses produced by the transmitter 1. The received oscillations are mixed in the receiver 3 with local oscillations to produce oscillations of a low or intermediate frequency in the usual manner. The receiver 3 also includes means (not shown) for detecting the intermediate frequency oscillations to derive video signals and for amplifying these video signals. The video signals are supplied over a lead 5 to the control electrode 6 of a cathode ray oscillograph 7 labelled P. P. I.

The indicator P. P. I., commonly known as a plan position indicator, is employed when the antenna 2 is arranged for rotation, as in the horizontal plane, to scan the horizon. The antenna 2 is supported on a mount 8 arranged for such rotation by means of a selsyn motor 9. The P. P. I. indicator 7 has a magnetic yoke consisting of two coils 10, 11 on opposite sides of the neck of the cathode ray tube 7 and a second pair of coils 12, 13, also arranged on opposite sides of the neck of the tube 7 and in quadrature with the coils 10, 11. As will be pointed out later, the yoke of the P. P. I. indicator produces a magnetic field arranged to be rotated about the cathode ray tube to control the direction in which the ray of the tube is deflected. This field is mechanically connected for rotation about the P. P. I. indicator by means of gears 14, 15 and selsyn motor 16 synchronous with the rotation of the support 8 on which the antenna is mounted. Thus, the direction in which the ray is deflected from the center of the screen 17 of the cathode ray tube 7 is maintained in continuous agreement with the orientation of the antenna 2 during the rotation thereof.

The transmitter 1 includes equipment for supplying, not only the pulses A of high frequency waves to the antenna 2, but likewise pulses B, of equal time occurrence as the pulses A, over a conductor 18 for providing radial scanning of the P. P. I. indicator 7. In the normal operation of the P. P. I. indicator, the pulses B are supplied over conductor 18 through a switch 19 thrown to its left-hand position indicated by the contact bearing the legend N and a coupling condenser 20 to the control grid 21 of the first electron discharge device 22 of a multivibrator circuit. The multivibrator circuit includes a second electron discharge device 23 whose control grid 24 is normally provided with a cut-off bias by means of a resistor 25 connected to a negative source of potential. The control grid 21, however, is normally provided with a positive bias through a fixed resistor 26 and a variable resistor 27 connected to a positive source of potential such as the battery 28 so that the tube 22 is normally conducting. The anode of the tube 22 is connected to control grid 24 of tube 23 through a resistor 29. Similarly, the anode of tube 23 is connected to the control grid 21 through a two-position switch 30 ganged with the switch 19 and one of the capacitors 31, 32, depending upon the position of the switch 30. When a negative pulse B is supplied to the control grid 21, the multivibrator circuit described is effective to produce, at the anode of tube 23, a negative pulse of voltage indicated by the legend C. The duration of the negative pulse of voltage C is determined by the recovery time of the tube 22 which, in turn, is controlled by the setting of the variable resistor 27 and the value of capacitor 31 or 32.

The negative pulse of voltage C is supplied through a coupling capacitor 33 to the control grid 34 of an electron discharge device 35 which operates as a clamping tube and the anode of which is connected through a two-position switch 36 to the mid-point of one of two sawtooth wave generators comprising, respectively, capacitors 37, 38, fixed resistors 39, 40, and variable resistors 41, 42. The switch 36 is ganged with switches 19, 30 for simultaneous operation therewith. Thus, when the switch 36 is thrown to its left-hand position to engage contact N, the sawtooth wave generator comprising the elements 37, 39, and 41 is effective to produce a sawtooth wave indicated by the legend D, the duration of the sawtooth wave D being determined by the duration of the negative pulse C and the amplitude of the wave D being determined by the setting of the resistance 41. The sawtooth waves D are supplied to three cascade connected amplifiers 43, 44, 45. The amplified sawtooth wave of current which flows in the anode circuit of amplifier 45 is conducted through the serially connected deflection coils 10, 11 of the magnetic yoke on the P. P. I. indicator 7. The pulse of current supplied to these coils operates to deflect the cathode ray of the tube 7 outward from the center of the screen 17 during a time equal to that required for a wave to travel from the antenna 2 to the most remote object to be detected and returned. The duration of this time is determined by the setting of the variable resistance 27, as previously explained.

Means are provided for returning the cathode ray to its innermost position on the screen 17 and comprise a feedback circuit between the amplifiers 43, 45. The amplifier circuit likewise includes means for restoring the proper D. C. potentials to the grid of tube 45 between successive sawtooth waves which comprise the diode 47 having its cathode connected to the control grid of amplifier 45 and its anode connected to a source of negative potential indicated by the legend —60 v. A resistance 48 is connected between the anode and cathode of the diode 47. In operation, the diode 47 insures that the grid of amplifier 45 does not go more than 60 v. negative between successive sawtooth waves. This insures that amplifier 44 will be able to properly drive amplifier 45.

When the switches 19, 30, 36 are thrown to the right-hand position to the contacts bearing the legend E, means are provided to supply a delayed sweep signal to the cathode ray tube 7. If, for example, the range of the system is 50 miles, the delayed sweep circuit is provided to start the radial scanning at a distance of say 40 miles and carry out the scanning to a distance of 45 miles, depending upon the desired magnification of closely spaced objects positioned at that range. Such a sweep would give a 10:1 magnification in the radial direction on the screen of the cathode ray tube 17. The delayed sweep circuit for the P. P. I. tube comprises a multivibrator circuit including the electron discharge devices 49, 50 to which the negative pulses B are supplied through a capacitor 51. In this multivibrator circuit, the tube 49 is normally conducting, the control grid thereof being supplied with positive potential through resistor 52 connected to the positive terminal of battery 28. At the same time, the tube 50 is normally non-conducting, since its grid is connected to the ground by means of conductor 53, while its cathode is biased positively by means of a resistance 54 common to the cathode circuits of both devices 49 and 50. When the pulse B is supplied to the grid of discharge device 49 through capacitor 51, this tube is rendered non-conducting, while the tube 50 is rendered conducting so that a negative pulse of voltage indicated by the legend E is supplied through a coupling capacitor 55 to the control grid 56 of an electron discharge device 57.

The device 57 normally conducts through diode 58 and maintains a potential difference across resistance 59. The positive terminal of resistance 59 is connected to the cathode of a cathode follower tube 60 through a capacitor 61. The cathode of tube 60 is connected through resistance 62 to the negative terminal of battery 28. When a negative pulse E is applied to the control grid 56, the current flow through the device 57 is cut off and the voltage impressed on the grid of the cathode follower 60 rises, as is indicated by the curve marked F. The cathode of the cathode follower 60 drives the cathode of the diode 58 to produce a constant voltage across resistor 59, thereby giving a linear sawtooth. This potential is likewise applied to the anode of diode 63, whose cathode is maintained at a positive potential, being connected through a variable tap 64 on the potentiometer 65. The potential of the cathode of the diode 63 is indicated by the curve marked G which indicates that the potential of this cathode rises when the sawtooth voltage F becomes equal to the cathode voltage of diode 63 as determined by potentiometer 65.

At the end of the negative pulse E, conduction through the diode 63 is cut off, resulting in a sharp drop in the potential of the cathode of diode 63. The potential wave G is applied across a differentiating circuit comprising capacitor 66 and resistance 67. The common point of the elements 66, 67 is connected to the control grid of an electron discharge device 68. By means of the differentiating circuit, the voltage pulse G is altered in form to that of curve marked H' which is supplied to the control grid 69 of the amplifier 68. The voltage pulse H' is inverted by the electron discharge device 68 and appears in its anode circuit as a current wave having the form of the curve marked H, which current flows through the primary winding 70 of an output transformer. The secondary winding 71 of this transformer has one terminal connected to the control grid 72 of an output amplifier 73 and the opposite terminal connected to a source of negative potential. Also connected between the terminals of the secondary winding 71 is a diode 74 having its cathode connected to the control grid 72 and its anode to the aforementioned source of negative potential. The function of this diode is to suppress the positive peak in the current wave H so that it does not appear in the output circuit of the tube 73. The anode of tube 73 is connected by means of conductor 75 to the right-hand contact of the switch 19.

In the operation of this delay circuit, the negative wave of voltage B is delayed for a time determined by the setting of the variable tap 64 on potentiometer 65. The operation of this portion of the sweep circuit may best be described by reference to the curves of Fig. 2 in which curve A shows the envelope of the pulse of voltage which is supplied to the antenna and the curve B, the form of the negative pulses of voltage which are supplied over the conductor 18 to the left-hand contact of switch 19. The desired pulse B, in turn, produces the negative square wave C in the output of the multivibrator circuit comprising discharge devices 22, 23 and the sawtooth wave D which is supplied to the control grid of amplifier 43 and, ultimately, to the deflection coils 10, 11 so that a radial scanning potential is obtained, the duration of which is equal to the time required for a wave to travel from the antenna 2 to the most remote object to be detected and return.

When it is desired to delay the sweep circuit so that enlargement of the scanning over a selected portion of the range is obtained, switches 19, 30, 36 are thrown to their right-hand positions. The negative pulse B is then supplied to the multivibrator circuit comprising discharge devices 49, 50 so that the square wave of voltage E is produced. The voltage E, in turn, is effective to produce the voltage F in the grid of the cathode follower 60. The voltage wave G is produced in the cathode of the diode 63. The wave G, in turn, is transformed through the operation of the differentiating circuit comprising elements 66, 67 and the amplifier 68 to produce the wave H in the anode circuit of this amplifier. The positive peak 77 of wave H is suppressed through the operation of the diode 74 so that the negative pulse of voltage I is supplied over conductor 75 to the switch 19. When the negative voltage I is impressed across the multivibrator circuit comprising discharge devices 22, 23, the voltage wave marked C' in Fig. 2 is produced. The time occurrence of the steep front 78 of the negative wave C' is the same as that of the negative pulse I. The time occurrence of trailing edge 79 of the wave C' is determined by the time constant of the discharge circuit including the capacitor 32. The wave C', in turn, is effective to produce the steeper sawtooth wave D' having a slope determined by the setting of the variable resistance 42 in the sawtooth wave generator comprising elements 38, 40, 42. Thus, if for example the range to be covered by the delayed sweep is 5 miles, the value of the resistance 42 is so set that the slope of the sawtooth wave D' is sufficient to move the cathode ray in oscilloscope 7 to the edge of the screen 17 in a time equal to the time required for a wave to travel from the antenna to an object 5 miles and return. Of course, the initial time occurrence of the sawtooth wave D' is determined by the occurrence of the negative wave I which, in turn, is dependent upon the setting of the variable tap 64. It is thus seen that, if the radio detection and ranging equipment employing my circuit has a radius of 50 miles, for example, and the duration of the sawtooth wave D' is equal to the time required for a wave to travel 5 miles and return, a 10:1 magnification in the radial direction is obtained of objects displayed on the screen of the P. P. I. indicator 7.

In order that a similar magnification may be obtained in the tangential direction, the two coils 12, 13 of the magnetic yoke on the P. P. I. indicator 7 are provided with a unidirectional current sufficient to spread or enlarge the displayed image tangentially by an arc which represents 5 miles. Such a unidirectional current is supplied through a switch 80 connected between one terminal of the coils 12, 13 and a movable contact 81 on a rheostat 82. The opposite terminal of the coils 12, 13 is connected to a mid-point 83 on the rheostat 82. The rheostat 82, in turn, is connected across a potentiometer 84 having a variable contact 85 mechanically connected with the variable tap 64 on potentiometer 65 for simultaneous operation therewith, as by means of hand wheel 86. The potential for the potentiometer 84 is supplied by any suitable unidirectional source, such as the battery 87. In this circuit, the rheostat 82 is connected between the negative terminal of the battery 87 and the variable contact 85.

The movable contact 81 is operated by hand wheel 88 through a slipping clutch arrangement which may be arranged so that the contact 81 on rheostat 82 always starts from a mid-position when a magnified scale is used. Such an arrangement may comprise a clutch element 89 which is connected to the shaft 90 which rotates contact 81. The cooperating clutch element 91 may be carried by the shaft 92 connected to the hand wheel 88. A cover 93 which engages the clutch element 89 may have a transverse slot 94 adapted to receive the clutch element 91 in one position only so that the clutch can be engaged and disengaged in one position only, namely, when the contact 81 is at the mid-point 83 of the rheostat 82 and no voltage is being impressed across the windings 12, 13. The slipping clutch arrangement may also include a biasing spring 95 which normally tends to disengage the clutch. The shaft 92 preferably is mechanically linked through a suitable gearing with the linkage connecting selsyn motor 16 and pinion 15 which drives the magnetic yoke of the P. P. I. indicator.

In the operation of this portion of the enlarged sweep circuit, the magnetic yoke of the P. P. I. tube is always held in correct, true bearing and is turned very slightly during sector scanning so as to correct slightly for the scanning error introduced through the operation of the deflecting coils 12, 13. This operation of the scale enlarging circuit of my invention may best be illustrated by consideration of the displays depicted in Figs. 3 and 4. Thus, Fig. 3 represents a normal display on the screen of the P. P. I. cathode ray tube when two closely spaced reflecting objects occur at a substantial distance from the antenna, and Fig. 4 represents the display on the tube when the delayed P. P. I. sweep circuit is employed together with the circuit for enlarging the display in a tangential direction. Thus, in Fig. 3 in the sector 96 which represents, for example, 5 miles square of area in the field being scanned, two closely spaced objects 97, 98 appear. However, they are sufficiently close that it is impossible to distinguish their relative positions or the distance between them. By the use of the circuits of my invention, the 5-mile area 96 is exploded or enlarged, as is shown in Fig. 4, to become the portion 96' representing the same area 5 miles square. The reflecting objects 97, 98 appear in their true positions with respect to each other and with respect to the correct bearing line 99. Furthermore, the lateral separations and the radial separations are reproduced to the same scale.

If, in the operation of the scale enlarging portion of the apparatus of Fig. 1, a target or reflecting object moves out of range of the enlarged scale, the hand wheel 88 may be turned to bring the movable contact 81 back to its mid-position. To effect this operation, the slipping clutch is disengaged, the hand wheel turned through one proper turn in the opposite direction, and the slipping clutch reengaged. If the hand wheel 88 is then operated to rotate the contact 81 about the rheostat 82, the display on the P. P. I. tube will be displaced by a predetermined number of degrees of bearing from its former position and the desired reflecting objects will now appear in the enlarged portion of the display.

It has been noted that, in the operation of the delay P. P. I. control and the display enlarging control, the variable contact 85 is mechanically linked with the variable tap 64. Because of this arrangement, a low voltage is impressed across the rheostat 82 when the delay sweep circuit is arranged to bring in targets located at greater ranges. As a consequence, at these ranges, less current is supplied to the coils 12, 13 and the area of the enlarged display remains constant for all settings of the range and bearing controls.

An important advantage of my improved form of P. P. I. display in a radio detection and ranging system is that the enlarged small portion of the area being scanned is preserved in its true relative position to the total scanned area so that all bearing positions can be accurately determined. This is obtained by limiting the range of the hand wheel 88 when engaging the clutch 89 to substantially one complete revolution. Thus, for example, in Fig. 4, all bearings can be measured with respect to the true bearing line 99. For shifting to a different true bearing line, the clutch must be disengaged and the hand wheel 88 turned, thus turning the P. P. I. yoke until a new true bearing is established and an enlarged display is measurable from this true bearing position.

Another important advantage of my improved apparatus is that the range control for the enlarged display is so connected with the control for enlarging the tangential portion of the display that the total enlarged area is always displayed on the cathode ray tube. The operation of the enlarging circuit is effected by a single hand wheel which is normally used for varying the display in bearing position. Furthermore, the change from normal display to enlarged display of a selected area is effected by a single set of gang switches. This simplicity of operation, coupled with the single control of the variable delay of the P. P. I. sweep, contribute to make a complete system which is easily operated and is variable over a substantial range of operations.

While my invention has been described by reference to a particular embodiment thereof, it will be understood that numerous modifications may be made by those skilled in the art without departing from the invention. I therefore aim in the appended claims to cover all such equivalent variations as come within the true spirit and scope of my invention.

What I claim as new and desire to secure by Letters Patent of the United States is:

1. In a circuit for a cathode ray tube of the type including means for producing a cathode ray, a control electrode, ray deflecting means, and a viewing screen, means for supplying successive sawtooth waves of current to said deflecting means to move said ray across said screen repeatedly in a radial direction, means for controlling the time occurrence and size of the display on said screen comprising means for varying the time occurrence and duration of said sawtooth waves, and means for supplying a unidirectional current to said ray deflecting means to move said ray across said screen in a tangential direction.

2. In a circuit for a cathode ray tube of the type including means for producing a cathode ray, a control electrode, ray deflecting means, and a viewing screen, means for supplying successive sawtooth waves of current to said deflecting means to move said ray across said screen repeatedly in a radial direction to obtain a display on said screen, means for varying the azimuth angle of said radially directed ray, and means for enlarging a selected portion of said display comprising means to control the time occurrence and duration of said sawtooth waves, and means controlled by said azimuth angle varying means to supply a unidirectional current to said deflecting means.

3. In combination, a cathode ray tube comprising means for producing a cathode ray, a control electrode, ray deflecting means, and a viewing screen, means for supplying a sweep voltage to said deflecting means to move said ray across said screen repeatedly in a radial direction from a fixed point to produce a display on said screen, means for varying the azimuth angle of said radially directed ray, and means for enlarging a selected portion of said display comprising means for controlling said voltage supplying means to vary the time duration and slope of said sweep voltage and the starting time of the movement of said ray from said point, means for applying to said deflecting means a second voltage for moving said ray across said screen in a direction normal to said radial direction, and means responsive to a variation in said starting time for varying the intensity of said second voltage, whereby a desired relationship between said normal and radial deflections of said ray in said enlarged display may be maintained.

4. A control circuit timed with respect to synchronizing pulses for producing a plan-position-indicating display on a cathode ray tube having beam deflecting elements and a screen comprising means timed with respect to said synchronizing pulses for repeatedly sweeping said beam radially at a given rate in a first coordinate across said screen, means for angularly sweeping said beam in a second coordinate across said screen at a given rate, means for changing the time commencement of said radial sweeping with respect to said pulses and the time rate and duration of said radial sweeping thereby altering said sweeping in said first coordinate, and means operative simultaneously with the alteration of sweeping in said first coordinate for varying the angular sweeping in said second coordinate.

5. In an object detection system in which impulses are transmitted and in which echo impulses are received after reflection from an object in space, a viewing screen, means utilizing the echo impulses to display on said screen the location of said object comprising means controlled by the transmitted impulses for linearly scanning said screen in a radial direction from a given point on said screen, a first means for varying the angular direction of said linear scanning from said point to derive a bearing indication for said object, and means to reproduce and enlarge a selected portion only of said display on said screen and for removing the remainder of said display from said screen comprising means for adjusting the starting time of said scanning means relative to said transmitted impulses and the time rate of scan across said screen, and a second means for varying the angular direction of said scanning simultaneously with the adjustment of said time rate of scan to maintain the same bearing indication for said object.

6. In an object detection system in which impulses are transmitted and in which echo impulses are received after reflection from an object in space, a viewing screen, means to display on said screen the location of said object relative to said system in two coordinates comprising means controlled by the transmitted impulses for scanning said screen linearly in one coordinate from a given point on said screen, a first means for varying the angular direction of said linear scanning from said point to derive a bearing indication for said object, and means to enlarge a selected portion of said display on said screen while removing the remainder of said display from said screen and to maintain an indication of the true bearing of said object relative to said system comprising means for adjusting the starting time of said one coordinate scanning means relative to said transmitted impulses and the time rate of scanning thereof while maintaining the maximum amplitude of said one coordinate scanning substantially constant, and a second means for varying the angular direction of said linear scanning on said screen simultaneously with the adjustment to said time rate of one coordinate scanning.

7. In an object echo system in which impulses are transmitted and in which echo impulses are received after reflection from an object in space, a viewing screen, means to indicate on said screen the azimuth angle and the distance to said object comprising means for linearly scanning said screen radially from a given point on said screen, means for varying the angular direction of said radial scanning from said point, and selective means for distorting the indication of distance to said object while maintaining the indication of the azimuth angle of said object comprising means for adjusting the starting time of said scanning means relative to the transmitted impulses and the time rate of radial scanning on said screen, and means included in said varying means for additionally varying the angular direction of said radial scanning.

8. In an object detection system in which impulses are directionally transmitted in a changing angular direction and in which echo impulses are directionally received after reflection from an object in space, a cathode ray tube of the type having means for producing a cathode ray, a control electrode, ray deflecting means, and a viewing screen, means for applying received echo impulses to said control electrode, means responsive to transmitted impulses for supplying successive sawtooth waves of current to said deflecting means to move said ray across said screen repeatedly in a radial direction to obtain a display of said echo impulses upon said screen, means for varying the angle of said radially directed ray relative to a fixed radial line in accordance with the direction of said received impulses, means for simultaneously adjusting the starting time of said sawtooth waves of current relative to a transmitted impulse and the slope and duration of said sawtooth waves of current to enlarge a portion of said display while eliminating the remainder of said display from said screen, and means for supplying a unidirectional current to said deflecting means for altering the angle of said radially directed ray simultaneously with the adjustment to the slope of said sawtooth waves.

References Cited in the file of this patent

UNITED STATES PATENTS

| | | |
|---|---|---|
| 2,300,189 | Wolff | Oct. 27, 1942 |
| 2,313,966 | Poch | Mar. 16, 1943 |
| 2,380,929 | Ahier et al. | Aug. 7, 1945 |
| 2,395,966 | Goldberg | Mar. 5, 1946 |
| 2,407,898 | Norgaard | Sept. 17, 1946 |
| 2,409,462 | Zworykin | Oct. 15, 1946 |
| 2,412,291 | Schade | Dec. 10, 1946 |
| 2,412,631 | Rice | Dec. 17, 1946 |
| 2,421,747 | Englehardt | June 10, 1947 |
| 2,422,654 | Bruce | June 24, 1947 |
| 2,426,201 | Grieg | Aug. 26, 1947 |
| 2,440,250 | Deloraine | Apr. 27, 1948 |
| 2,450,341 | Hershberger | Sept. 28, 1948 |
| 2,453,711 | Isbister | Nov. 16, 1948 |
| 2,454,810 | Labin | Nov. 30, 1948 |
| 2,471,408 | Busignies | May 31, 1949 |
| 2,475,707 | Jeanne | July 12, 1949 |

FOREIGN PATENTS

| | | |
|---|---|---|
| 552,072 | Great Britain | Mar. 22, 1943 |